(12) United States Patent
Hong

(10) Patent No.: US 6,681,899 B1
(45) Date of Patent: Jan. 27, 2004

(54) AUTOMATICALLY ILLUMINATION CONTROL DEVICE OF AN ELEVATOR DISPLAY SCREEN

(76) Inventor: Chi-Jung Hong, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/195,169

(22) Filed: Jul. 16, 2002

(51) Int. Cl.[7] ................................ B66B 3/00
(52) U.S. Cl. ................ 187/391; 187/395; 187/396; 187/397
(58) Field of Search .................. 187/391–396, 187/413, 397, 399

(56) References Cited

U.S. PATENT DOCUMENTS

| | | | | |
|---|---|---|---|---|
| 4,019,607 A | * | 4/1977 | Mandel et al. | 187/395 |
| 4,022,296 A | * | 5/1977 | Mandel et al. | 187/395 |
| 6,161,655 A | * | 12/2000 | Lejon et al. | 187/392 |
| 2002/0036121 A1 | * | 3/2002 | Ball et al. | 187/391 |

FOREIGN PATENT DOCUMENTS

| | | | | |
|---|---|---|---|---|
| JP | 02100980 A | * | 4/1990 | B66B/3/02 |
| JP | 03249079 A | * | 11/1991 | B66B/3/00 |

* cited by examiner

Primary Examiner—Jonathan Salata

(57) ABSTRACT

An automatically illumination control device of an elevator display screen serves for displaying the position and maintenance of the elevator. A light sensor for detecting the intensity of light is installed to the display screen. The light sensor detects the illumination of the environment light and the illumination of the display screen is controlled automatically by using a control circuit so as to present a soft light which is warm to the visual sense. Moreover, the automatically illumination control device has the advantages of power saving and long lifetime.

3 Claims, 3 Drawing Sheets

AUTOMATICALLY ILLUMINATION CONTROL DEVICE OF AN ELEVATOR DISPLAY SCREEN

BACKGROUND OF THE INVENTION

1. Field of the Invention

The present invention relates to display screens, and particularly to an automatically illumination control device of an elevator display screen for controlling the illumination of the light emitting elements of the display screen.

2. Description of Related Art

Elevators are necessary devices for tall buildings. In general display screens are installed beside or above the elevator doors for displaying the traveling condition of the elevator, as shown in the FIG. 1. The current display screen is mainly formed by LEDs which have constant illuminations independent of the intensity of environment light. However, this prior art has the following disadvantages:

1. Since the intensity is fixed, the illumination is weak in daytime so that the user can not see the display content clearly.
2. At night, the illumination of the display screen is too strong to feel comfortably.
3. When deep in the night, the display screen has a fixed illumination, not only power is wasted, but also the lifetime is reduced. Moreover, the structure of the display screen will deteriorate.

To improve above detect, some elevator display screens are added with sleep devices. When for a time period, an elevator is not been used, the illumination of the display screen will become dark so as to save power and prolong the lifetime. However, this improvement can not be resolve the problem induced from the change of the environment light.

SUMMARY OF THE INVENTION

Accordingly, the primary object of the present invention is to provide an automatically illumination control device of an elevator display screen, wherein the light sensor detects the illumination of the environment light and the illumination of the display screen is controlled automatically by using a control circuit so as to present a soft light which is warm to the viewer. Moreover, the automatically illumination control device has the advantages of power saving and long lifetime.

To achieve the object, the present invention provides an automatically illumination control device of an elevator display screen having an elevator display screen; the display screen being installed with a driving circuit; the display screen having a microprocessor, a control circuit and at least one light sensor; wherein the elevator display screen is installed with an array of light emitting elements. The light sensor is installed to the display screen for detecting environment light out of an elevator and then outputting the signals to the control circuit. The control circuit comparing signals outputted from the light sensor and transferring the signals to the microprocessor. The microprocessor performing operation; and the display screen serves to change illumination of light outputted to the display screen.

The advantages of the present invention will be described in the followings.

1. When the light sensor feels that the environment light is intense, the illumination of the display screen will increase so as to be identified easily.
2. When the environment light is weak, the illumination of the display screen will decrease so as to be identified easily.
3. The illumination of the display screen is adjusted intelligently so that the display screen has a proper illumination and thus the lifetime of the display screen is prolonged. The material of the display screen can not be deteriorated.
4. The display screens of different stories has different illuminations.

The various objects and advantages of the present invention will be more readily understood from the following detailed description when read in conjunction with the appended drawing.

DETAILED DESCRIPTION OF THE PREFERRED EMBODIMENTS

The structure and effect of the automatically illumination control device of an elevator display screen according to the present invention will be described herein with the reference drawings. One preferred embodiment according to the present invention is used in the following as an example for easily understanding the present invention by those skilled in the art.

Figure 1:
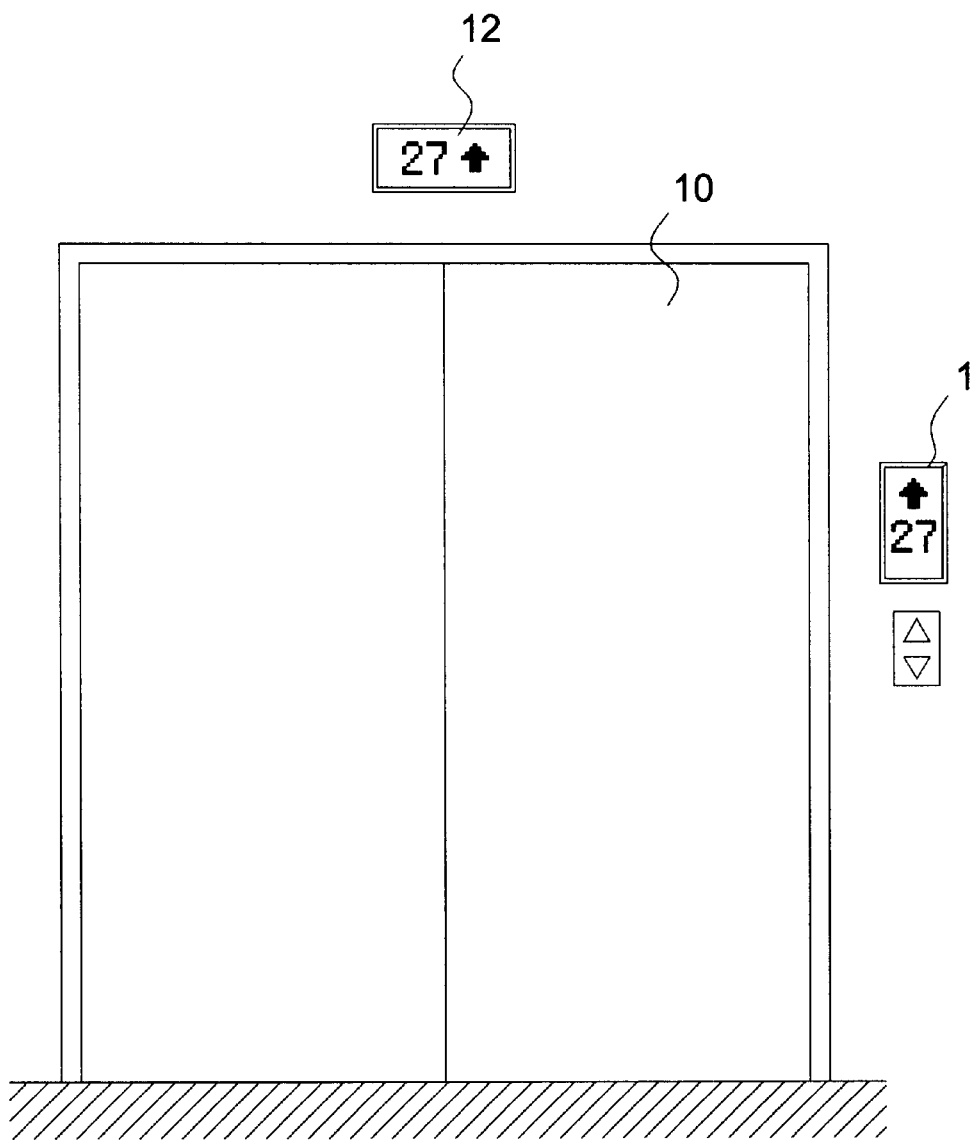
FIG. 1 is a schematic view of the display screen of an elevator according to the present invention.
Figure 2:
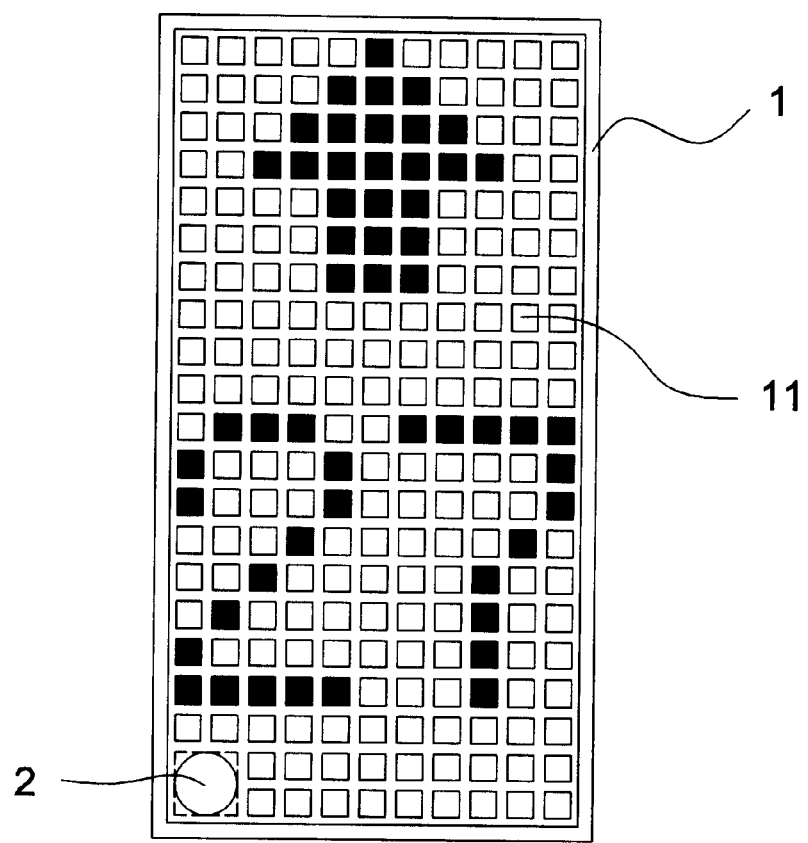
FIG. 2 is an enlarge schematic view of the elevator display screen of the present invention.

The elevator display screen 1 or 12 according to the present invention is installed on a wall at a lateral side or an upper side of an elevator door 10. The display screen 1 or 12 is formed by a plurality of light emitting elements 11 which are arranged as an array, such as LEDs or LCDs, as shown in the FIG. 2. At least one light sensor 2 is installed to a predetermined position of the display screen 1 or 12.

The light emitting element 11 can detect light intensity of the environment. In application, the light sensor 2 can be a light sensitive resistor. Since the resistor of the light sensitive resistor is changeable with respect to the intensity of the radiating light, when the strength of the radiating light increases, the resistor of the light sensitive resistor will reduce. By the characteristic of the light sensitive resistor, when the light sensor 2 detects a strong light, the resistor will decrease. On the contrary, when the light sensor 2 detects weak light, the resistor will increase.

Other than light sensitive resistor, above mentioned light sensor 2 may be an infrared sensor or other equivalent element with light detecting ability or other elements with function like the light sensitive resistor.

Figure 3:
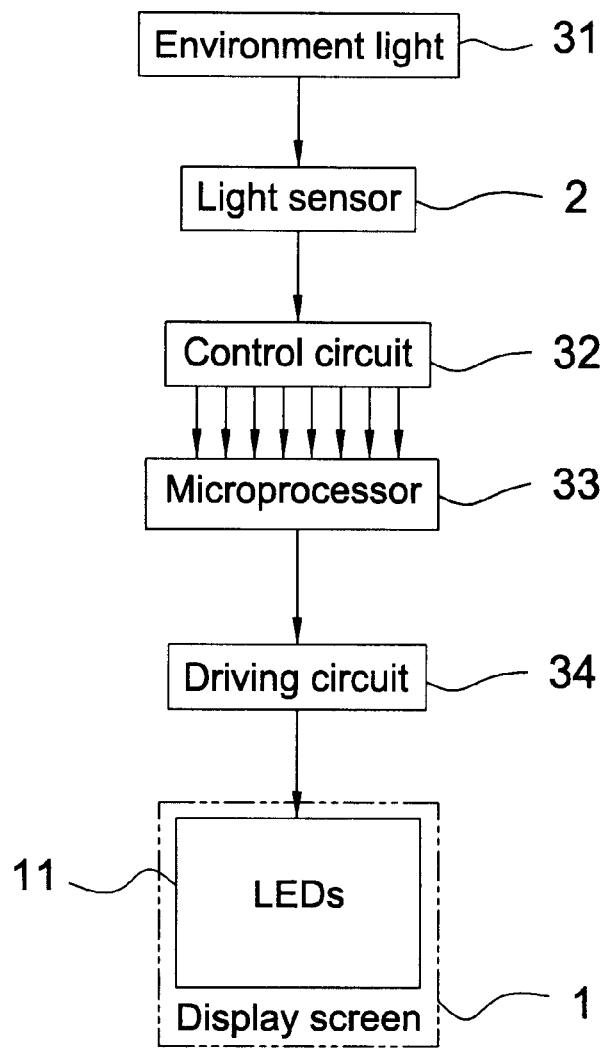
FIG. 3 is a block diagram showing the arranged of the present invention.

To achieve the object of getting the automatically illumination control device of an elevator display screen, in the present invention, the automatically illumination control device of an elevator display screen of the present invention can be realized by the block diagram of FIG. 3. When the light sensor 2 detects the light intensity of the environment light 31, the resistor of the light sensor 2 will change according to the sensed result and then outputs an analog signal to a control circuit 32 to be compared with a default reference voltage. Then the analog signal is converted into digital signal to be sent to a microprocessor 33 for being processed. A driving circuit 34 is used to control the illuminations of the plurality of light emitting element 11 of the display screens 1 or 12. Thereby, the illuminations of the light emitting elements 11 of the display screen 1 or 12 are adjusted with the change of the environment light.

Although the user may feel that the display screen 1 or 12 lights up continuously. In fact, it is flashed by a sequence of ON-OFF operations. That is, when the display screen is a high voltage, it turns ON and lights up. On the contrary, when the display screen is at a lower voltage, then it will turn off. From the viewpoint of visual feeling, the longer the turning on period or the short the turn off period, the brighter the display screen. Moreover, the shorter the turn on period or the longer the turn off period, the darker the display screen.

When the light sensor 2 detects a weak intensity, it will reduce the time period of turning-on and increase the time period-of-turning-off so that the illumination of the display screen 1 will become dark. On the contrary, When the light sensor 2 detect a strong intensity, it will increase the time period of turning-on and reduce the time period of turning-off so that the illumination of the display screen 1 will become bright. Thereby, the, control of the display screen 1 or 12 (time period control for low voltage and high voltage) is controlled according to the variation of the resistor of the light sensitive resistor. Thus the change of the illumination of the display screen 1 can be performed by stages or continuously.

Therefore, the automatically illumination control device of an elevator display screen of the present invention is different from the conventional one which has a display screen with a fixed illumination. The illumination of the display screen of the present invention is changeable with the environment light so as to meet the practical requirement. Although the present invention has been described with reference. to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An automatically illumination control device of an elevator display screen having an elevator display screen; the display screen being installed with a driving circuit; the display screen having a microprocessor, a control circuit and at least one light sensor; wherein the elevator display screen is installed with an array of light emitting elements; characterized in that:

the light sensor is installed to the display screen for detecting environment light outside an elevator and then outputting signals about detected light intensity to the control circuit;

the control circuit comparing signals outputted from the light sensor and with default values and then transferring comparing results to the microprocessor; and the microprocessor causes the display screen to change illumination of light according to the comparing result outputted to the display screen.

2. The automatically illumination control device of an elevator display screen as claim in claim 1, wherein the light sensor is selected one from a group containing light sensitive resistors and infrared sensors.

3. The automatically illumination control device of an elevator display screen as claim in claim 1, wherein the illumination of the display screen is changed by stages or continuously.

\* \* \* \* \*